United States Patent
Lopez Alvarez et al.

(10) Patent No.: US 11,816,866 B2
(45) Date of Patent: Nov. 14, 2023

(54) COMPENSATING FOR OPTICAL CHANGE IN IMAGE CAPTURE DEVICE COMPONENTS OVER TIME

(71) Applicant: Apple Inc., Cupertino, CA (US)

(72) Inventors: Miguel Angel Lopez Alvarez, Cupertino, CA (US); Yonghui Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/805,056

(22) Filed: Jun. 2, 2022

(65) Prior Publication Data
US 2022/0398779 A1   Dec. 15, 2022

Related U.S. Application Data

(60) Provisional application No. 63/208,814, filed on Jun. 9, 2021.

(51) Int. Cl.
*H04N 23/81* (2023.01)
*H04N 23/88* (2023.01)
(Continued)

(52) U.S. Cl.
CPC .............. *G06T 7/80* (2017.01); *H04N 9/646* (2013.01); *H04N 17/002* (2013.01);
(Continued)

(58) Field of Classification Search
CPC ........... H04N 23/80; H04N 1/56–6097; H04N 1/40006
(Continued)

(56) References Cited

U.S. PATENT DOCUMENTS

| 7,362,895 B2 | 4/2008 | Masumura |
| 9,588,260 B2 | 3/2017 | Koizumi |

(Continued)

FOREIGN PATENT DOCUMENTS

| JP | H11272253 A | 10/1999 |
| JP | 2004193707 A * | 7/2004 |

(Continued)

*Primary Examiner* — Anthony J Daniels
(74) *Attorney, Agent, or Firm* — Blank Rome LLP

(57) ABSTRACT

Devices, methods, and non-transitory program storage devices (NPSDs) are disclosed to compensate for the predicted color changes experienced by camera modules after certain amounts of time of real world use. Such color changes may be caused by prolonged exposure of optical components of the camera module to one or more of: solar radiation, high temperature conditions, or high humidity conditions, each of which may, over time, induce deviation in the color response of optical components of the camera module. The techniques disclosed herein may first characterize such predicted optical change to components over time based on particular environmental conditions, and then implement one or more time-varying color models to compensate for predicted changes to the camera module's color calibration values due to the characterized optical change. In some embodiments, optical changes in other types of components, e.g., display devices, caused by prolonged environmental stresses may also be modeled and compensated.

20 Claims, 6 Drawing Sheets

(51) Int. Cl.
   *G06T 7/80* (2017.01)
   *H04N 17/00* (2006.01)
   *H04N 9/64* (2023.01)
   *H04N 23/10* (2023.01)

(52) U.S. Cl.
   CPC ............ *H04N 23/10* (2023.01); *H04N 23/81* (2023.01); *H04N 23/88* (2023.01); *G06T 2207/10024* (2013.01)

(58) Field of Classification Search
   USPC .................................................. 348/207.99
   See application file for complete search history.

(56) References Cited

U.S. PATENT DOCUMENTS

| | | | |
|---|---|---|---|
| 10,594,905 | B2 | 3/2020 | Taneda |
| 11,460,894 | B2 * | 10/2022 | Cha ........................ G06F 1/1686 |
| 11,568,812 | B2 * | 1/2023 | Iwauchi ............... G09G 3/3233 |
| 2006/0109358 | A1 | 5/2006 | Song |
| 2021/0297637 | A1 * | 9/2021 | Chang .................... H04N 23/84 |

FOREIGN PATENT DOCUMENTS

| | | | |
|---|---|---|---|
| JP | 2005012427 A | * | 1/2005 |
| JP | 2009285191 A | * | 12/2009 |
| JP | 2011095492 A | | 5/2011 |
| JP | 2012169917 A | | 9/2012 |
| JP | 2013210564 A | | 10/2013 |

\* cited by examiner

COMPENSATING FOR OPTICAL CHANGE IN IMAGE CAPTURE DEVICE COMPONENTS OVER TIME

TECHNICAL FIELD

This disclosure relates generally to the field of image processing. More particularly, but not by way of limitation, it relates to techniques for color compensation due to optical changes in optical components of camera modules and/or other components of electronic devices over time.

BACKGROUND

Optical components inside a camera module, e.g., a camera module within a mobile phone or other personal electronic device, may include various lenses, infrared (IR) cutoff filters, anti-reflective coatings, and color filter arrays (CFAs), etc. Such components can experience optical changes from exposure to solar radiation, high humidity, and/or high temperatures over time. As a result, it is possible that these components may experience deviations in their initial spectral transmittances, spectral emissivity (or in other optical characteristics), which may impact the total color response of the camera module.

In some cases, one or more camera color calibration values may be stored in a camera module's memory at factory calibration time, i.e., calibration values that were measured when the module was manufactured. At some point in time, however, e.g., due to the aforementioned optical changes that may be experienced over time in various optical components of the camera, it is possible that these color calibration values may result in images that are less photorealistic than may be preferred, e.g., once the camera module has been used by customers inside their mobile devices in real-world environmental conditions for a number of years, and it may be desirable to adjust for these changes.

Thus, there is a need for methods and systems that provide for improved time-varying compensation for predicted optical changes experienced over time in the optical elements of camera modules or other components of electronic devices.

SUMMARY

Devices, methods, and non-transitory program storage devices (NPSDs) are disclosed herein to provide for improved time-varying software-based color correction of camera module color calibration values. According to some embodiments, there is provided a device, comprising: a memory; one or more image capture devices; and one or more processors operatively coupled to the memory, wherein the one or more processors are configured to execute instructions causing the one or more processors to: obtain a time-varying color model for a first component of a first one of the one or more image capture devices, wherein the time-varying color model is configured to model an amount of color calibration to apply to the first image capture device over time to compensate for optical change in the first component; obtain a first image captured by the first image capture device at a first time; and color correct the first image according to the time-varying color model and the first time.

For example, the color correction may be applied according to the time-varying color model by adjusting one or more color component measurements, such as a red (R), green (G), or blue (B) response of the camera module, and/or a combination or ratio of color component measurements (e.g., R/G and B/G ratios) for one or more predefined white points that are used to calibrate the first image capture device. In other cases, a camera module may be calibrated at factory calibration time based on the spectral transmissivity (and/or spectral emissivity, e.g., in the case of a display component—rather than a camera component—being compensated for, as will be discussed below) of a given component over one or more particular wavelengths of light. In other words, whatever parameters a particular device manufacturer uses to perform its camera (or display) module color calibration at factory calibration time may be modeled for their optical changes over time due to exposure to particular environmental conditions—and then compensated for over time.

According to some embodiments, the first component comprises an optical component of the first image capture device, such as: a lens; an infrared (IR) cutoff filter; an anti-reflective coating; or a color filter array (CFA).

According to other embodiments, the optical change modeled by the time-varying color model is caused by one or more of: exposure of the first component to solar radiation; exposure of the first component to humidity; or exposure of the first component to heat. In some examples, the optical change modeled by the time-varying color model comprises deviations in factory-calibrated values of one or more of: spectral transmittance; or color response. In some embodiments, the amount of color calibration compensation applied by the time-varying color model may be limited to a predetermined maximum value (e.g., 2%, 3%, etc.); and such predetermined maximum value may be a maximum compensation value for the lifetime of the camera module, or may instead be a predetermined maximum compensation value per each of a predefined time period that follows an initial factory calibration of the first image capture device (e.g., a maximum of up to 2% additional compensation applied every 2 years, a maximum of up to 3% additional compensation applied every 3 years, etc.).

In other embodiments, the time-varying color model may be refined by input data from one or more sensors of the device housing the camera module (e.g., a thermometer, GPS, altimeter, ambient light sensor) and/or one or more applications executing on the device, and the input data may comprise one or more of: a location of the device; a temperature in an ambient environment of the device; a humidity level in an ambient environment of the device; or a light level in an ambient environment of the device. In some cases, the time-varying color model that is used may be selected from among a plurality of candidate time-varying color models, based, at least in part, on the input data received from one or more sensors or applications executing on the device.

According to still other embodiments, the time-varying color model may comprise a machine learning (ML) model trained to learn a correlation between one or more environmental factors experienced by the device over time and an amount of corresponding optical change (e.g., in terms of transmittance, emissivity, etc. of certain wavelengths of light) caused to the first component of the first image capture device. In other cases, the time-varying color model may simply comprise a function (e.g., linear, polynomial, exponential, piece-wise defined, etc.) configured to correlate between one or more environmental factors experienced by the device over time and an amount of corresponding optical change caused to the first component of the first image capture device.

According to yet other embodiments, the one or more processors are further configured to: obtain a second time-varying color model for a second component of a display of an electronic device (e.g., with the second model related to a display component being used in addition to, or instead of, the aforementioned first time-varying color model, which is for a first component of a first image capture device), wherein the second time-varying color model is configured to model an amount of color calibration to apply to images displayed on the display over time to compensate for the color of the second component; obtain a second image for display on the display of the device at a second time; color correct the second image according to the second time-varying color model and the second time; and display the color-corrected second image on the display.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

Figure 1:
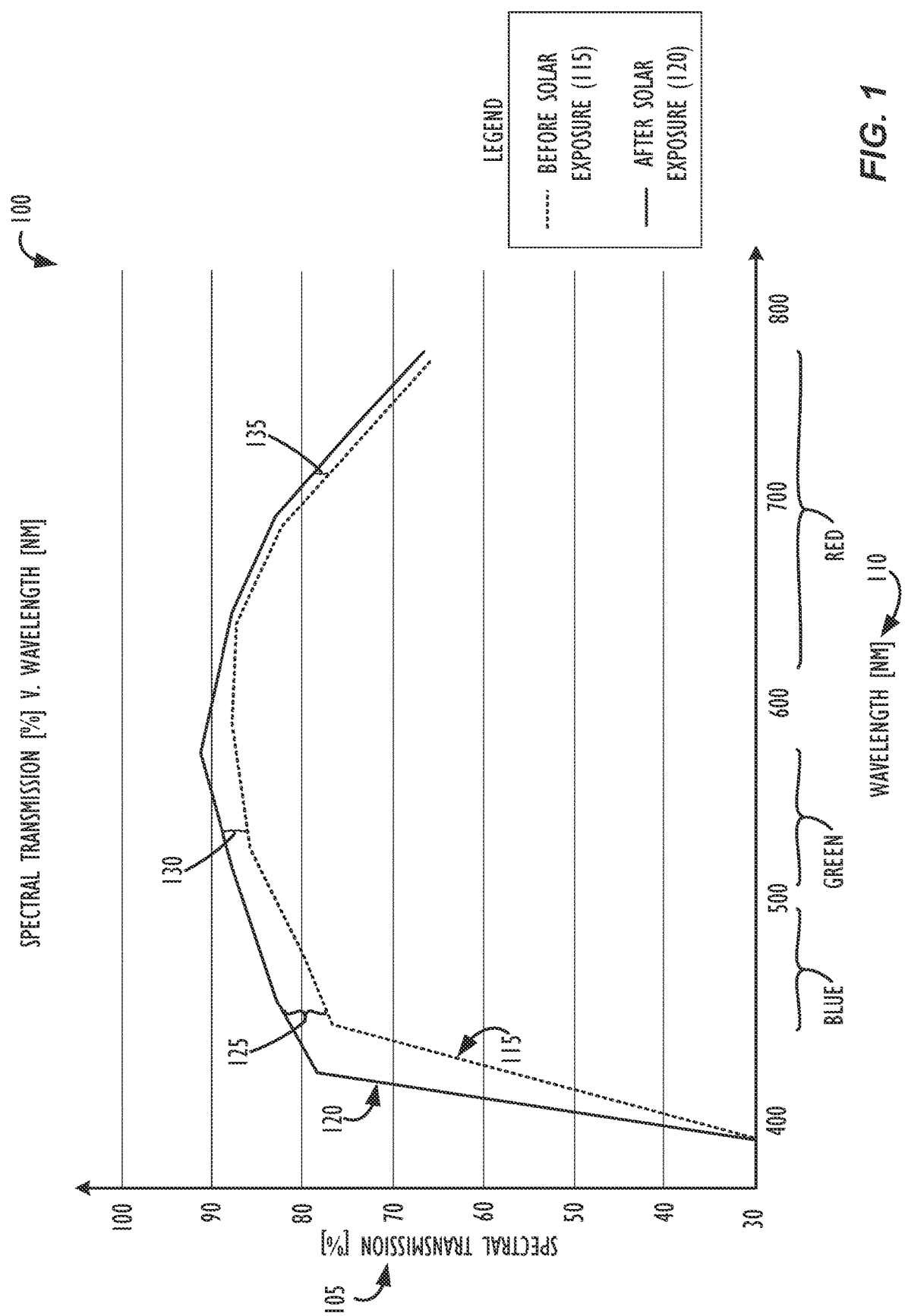
FIG. 1 illustrates a graph of spectral transmittance of an optical element of an image capture device plotted against wavelengths of light, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

As mentioned above, the techniques disclosed herein provide for improved time-varying software-based color correction of camera module color calibration values, e.g., to compensate for color changes that may be experienced by customers' mobile camera devices after a certain amount of time (e.g., typically over the span of several years) of normal usage and exposure to environmental conditions. Such color changes may be caused by exposure to a combination of one or more of: solar radiation, high temperature conditions, and/or high humidity conditions, each of which may induce some degree of change in the characteristics of one or more optical components of the camera module, e.g., lenses, IR cutoff filters, anti-reflective coatings, CFAs, etc. For example, ultraviolet (UV) radiation can damage plastic components of camera lenses over time, causing them to have a more significant blue content, thereby affecting the color of images taken by the camera module.

As a result of exposure to various environmental stresses, certain camera module components (and/or other device components with optical elements) may experience a change in their spectral transmittances, which may impact the total color response of the camera module, as will be described in greater detail below with respect to FIG. 1. Due to the change in optical properties of such components, the continued use of camera color calibration values stored in the camera module's memory, e.g., as measured at factory calibration time, may result in captured images that are less photorealistic than may be preferred after a certain period of usage by customers in real world environments. Thus, it would be desirable to be able to accurately model and compensate for these predicted effects over time, as errors in color calibration values of larger than 3% may be perceptible by customers as causing less photorealistic colors in their captured (or displayed) images.

Exemplary Optical Changes in Components of Image Capture Device Due to Environmental Stresses Over Time Turning now to FIG. 1, a graph 100 of spectral transmittance of an optical element of an image capture device plotted against wavelengths of light is shown, according to one or more embodiments. Along the y-axis 105 of graph 100 is spectral transmission percentage for the exemplary optical element being plotted in graph 100. Along the x-axis 110 of graph 100 is the wavelength of light (as measured in nanometers) for which the spectral transmission percentage of the exemplary optical element being plotted in graph 100. As illustrated, from left to right across the x-axis, the wavelengths of light correspond to: visible blue light, visible green light, and visible red light.

Dashed line 115 represents the spectral response of the exemplary optical element before solar exposure. Solid line 120 represents the spectral response of the exemplary optical element after an exemplary amount of simulated solar exposure (e.g., 2 years of normal camera usage). As illustrated in graph 100, there are noticeable differences in spectral transmission of the optical element across the spectrum of visible light wavelengths when comparing the line 115 (i.e., before solar exposure) to line 120 (i.e., after solar exposure). In fact, the difference (125) between the two curves is more pronounced over shorter wavelengths, such as blue light, than it is over wavelengths associated with either green (130) or red (135) visible light.

By successfully modeling the effects of these changes in spectral transmission over time across the spectrum of light, a time-varying software-based color model may be developed to compensate for predicted deviations in the camera module's factory calibration settings over time, e.g., due to exposure to such environmental stresses. As will be understood, the more closely the environmental conditions under which the model was generated match or reflect the environmental conditions the device faces during real world usage, the more accurately the real changes to the optical characteristics of the camera module may be compensated for. However, due to the difficulty in accurately predicting the exact environmental conditions that a user's camera module will be exposed to over years of usage (and, indeed, whether any measurable optical changes at all will occur in the camera module's optical components over the years that it is used by a customer), performing a more conservative compensation approach to the camera module's color calibration values (e.g., in terms of both the frequency and/or degree of compensation applied) may help to ensure that the camera module stays within a tolerable threshold for color accuracy (e.g., within 3% error) for as many years of camera module usage as possible. A conservative approach may also help ensure that the model does not "over-compensate" the camera's color calibration, e.g., in the event that the camera module is not exposed to as many (or as extreme) of environmental conditions as predicted by the model and/or less than the amount of modeled optical change actually occurs in the camera module components over time.

Figure 2:
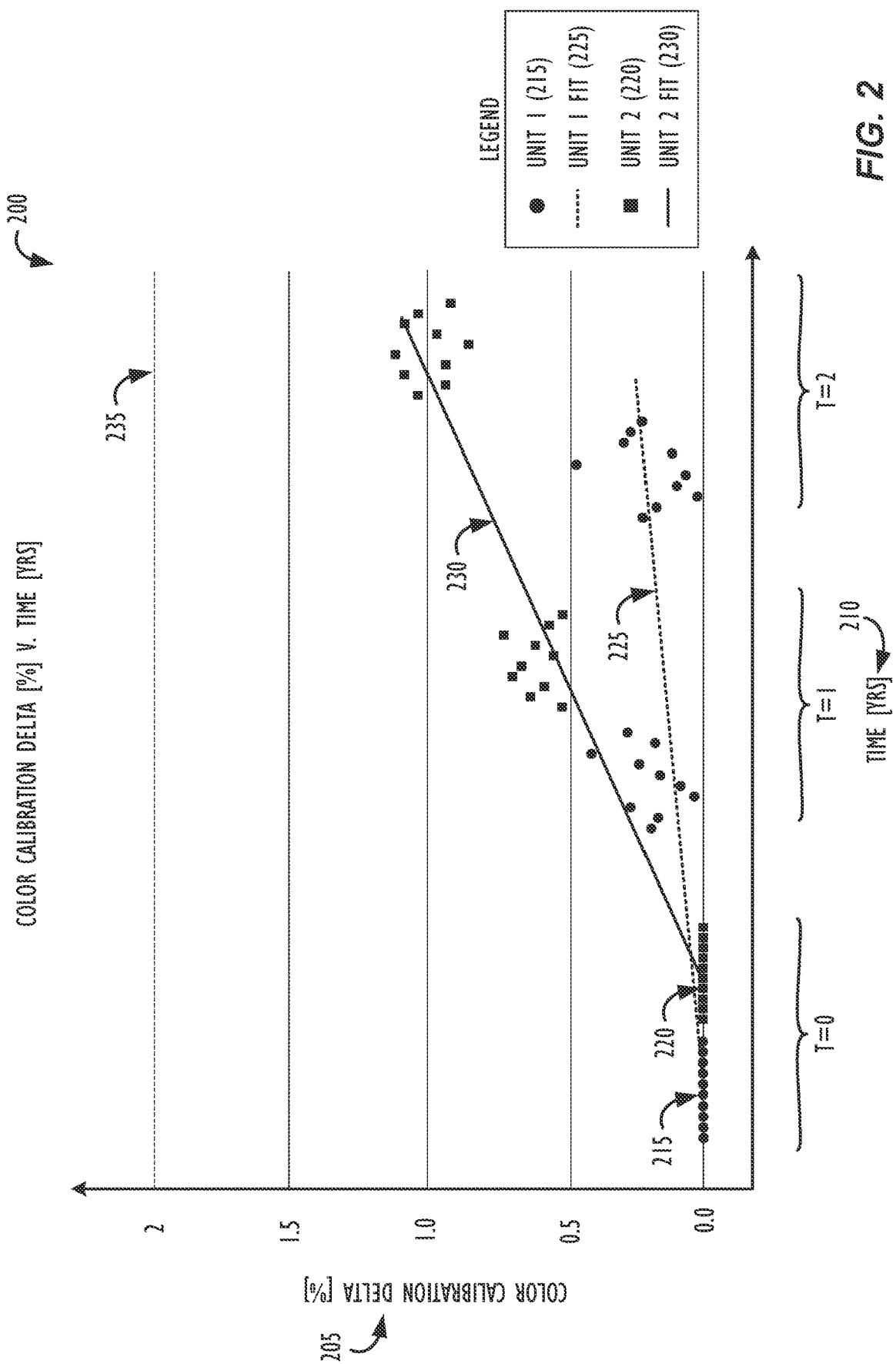
FIG. 2 illustrates a graph of color calibration deltas for an optical element of an image capture device plotted against time, according to one or more embodiments.

Turning now to FIG. 2, a graph 200 of color calibration deltas (i.e., differences in color calibration values needed) for an optical element of an image capture device plotted against time is shown, according to one or more embodiments. Along the y-axis 205 of graph 200 is color calibration delta percentage for the exemplary optical elements being plotted in graph 200, i.e., the amount by which the "factory" color calibration values will have deviated over time from their initial values, e.g., based on changes in the optical characteristics the various optical components. It is to be understood that the use of "percentage" as the unit of measurement for the color calibration delta along the y-axis is merely exemplary, and that any desired type of measurement unit may be used. Along the x-axis 210 of graph 200 is time (as measured in "simulated" years of component usage) for ten samples of two exemplary components, i.e., unit 1 (215) and unit 2 (220), whose change in color reproduction capability is being plotted in graph 200. As illustrated, from left to right across the x-axis, at an initial time (T=0 years), none of the ten samples of unit 1 (215) or the ten samples of unit 2 (220) require any additional color calibration (i.e., their color calibration delta percentage is 0%). However, after the passage of one year of simulated environmental stresses (T=1 years), the ten samples of unit 1 (215) have begun to show a need for between 0 and 0.5% of additional color calibration from initial factory calibration values, while the ten samples of unit 2 (220) have begun to show a need for between 0.5 and 0.8% of additional color calibration from initial factory calibration values. After the passage of two years of simulated environmental stresses (T=2 years), the ten samples of unit 1 (215) appear to have leveled off and continue to need between 0 and 0.5% of additional color calibration from initial factory calibration values, while the ten samples of unit 2 (220) have apparently continued to deviate, and now show a need for between 0.8 and 1.2% of additional color calibration from initial factory calibration values.

Regression lines 225 and 230 illustrate that a function of best fit may be determined for each unit to model the additional amount of color calibration needed over time due to the predicted change in color reproduction capability of each respective unit. As illustrated in FIG. 2, the regression lines 225 (for unit 1 215) and 230 (for unit 2 220) may be modeled as simple linear functions with slopes and offsets, e.g., representing a least squares regression line (LSRL) or other form of best fit. In one example, the model line of best first for exemplary unit 2 220 could be implemented using the following equation:

$$\text{CAL\_DELTA}(T) = \text{CAL\_DELTA}(T0) + 0.5*T \quad \text{(Eqn. 1)},$$

wherein CAL_DELTA(T) is the color calibration delta percentage to be applied to the camera module at a time, T, in years; CAL_DELTA(T0) is an initial color calibration delta percentage needed at time T=0 years (which would be 0, assuming no additional color calibration delta is needed immediately after factor calibration and before real-world usage), and T is the current age of the camera component in years. In other words, in the example Eqn. 1, an additional 0.5% of color calibration delta is applied for each passing year that the camera component has been in use.

As mentioned above, this Eqn. 1 could also be subject to some predetermined maximum value, e.g., never applying a color calibration delta of more than 2% (as shown by dashed line 235), or 3%, or 1%, etc., even if the evaluation of Eqn. 1 results in the calculation of a value larger than the predetermined maximum value after a certain number of years. Likewise, if the color calibration delta is measured in different measurement units than percentages, a predetermined maximum value may also be established in the appropriate measurement units. By employing a predetermined maximum amount of color calibration, it can be ensured that no color errors will be noticed by customers due to the model-applied compensation, e.g., in the event that their camera modules do not actually suffer the predicted amount of optical change due to environmental conditions over the lifetime of the camera module. If, however, the predicted amount of optical change (or more) does occur to the camera module, limiting the amount of correction to the predetermined maximum amount will still be useful to prevent color errors.

It is to be understood that other types of functions may also be used to model the amount of additional color calibration delta needed by a given type of unit over time, e.g., a polynomial function, an exponential function, or a piecewise-defined function. The determined time-varying color model may then be stored in memory (e.g., in software or firmware) of a camera module or an electronic device in which this camera module is embedded, such that it can be applied over time to correct for the predicted amount of optical change in each respective unit as the camera is used in the real world by a customer.

In other embodiments, the time-varying color model may comprise an ML model trained to learn a correlation between one or more environmental factors experienced by the device over time and an amount of corresponding optical change experienced in a component of an image capture device. For example, the trained ML model could be used to correlate real-time predicted exposure to solar radiation (e.g., based on information obtained from ambient light sensors and/or weather applications executing on the device the camera is embedded in) to an amount of additional color calibration compensation the camera module may require. For another example, Principal Component Analysis (PCA) may be used to determine the relative importance of each environmental factor (e.g., temperature, humidity, etc.) on the color calibration delta needed by the device. Additionally, neural networks could be trained with data from real devices tested in real-world situations during the development phase of a camera product, for which the color calibration characteristics could be regularly measured over time, along with all the data gathered by sensors regarding ambient temperature, exposure to radiation, humidity levels, etc. An ML model could be helpful in providing more accurate and/or finer-grained predictions of changes in optical components of image capture devices over time. For example, it may be determined during the training of the model that a movement of 5 degrees in average ambient temperature conditions between, say, 45 to 50 degrees Celsius, has a far greater effect on color reproduction capability over time than an equivalent movement of 5 degrees in average ambient temperature conditions between, say, 25 to 30 degrees Celsius. Such nuance may not be capturable in a simpler model, e.g., a model that would assume any increase in average ambient temperature of 5 degrees would have an equivalent effect on device component performance. In some cases, the output of two or more ML models, e.g., each model trained to predict the amount of optical change in particular components and/or due to particular environmental conditions, may be superimposed to predict an overall amount of change in color performance of a camera module and, by extension, an amount of additional color compensation to apply to the camera module to reduce any undesired deviations in color reproduction that may be experienced over time in captured images.

In still other embodiments, the final time-varying color model to be used for a given camera module may superimpose different corrections obtained from different environmental stress tests. For example, a characterized correction for solar exposure can be added to another characterized correction for high temperature and/or high humidity environmental conditions. Additionally, information from sensors embedded in a mobile device housing the camera module (e.g., location sensors, GPS, temperature sensors, altimeters, humidity sensors, ambient light sensors, etc.) may be used to fine tune and refine the amount of correction applied. In some cases, one or more types of sensors, e.g., a location sensor and a clock application, may be used to provide an estimate of ambient temperature and/or humidity levels, i.e., by using the mobile device's current location on Earth and the time of day (and year) to derive present estimates of such environmental conditions in the ambient environment of the camera module.

Figure 3:
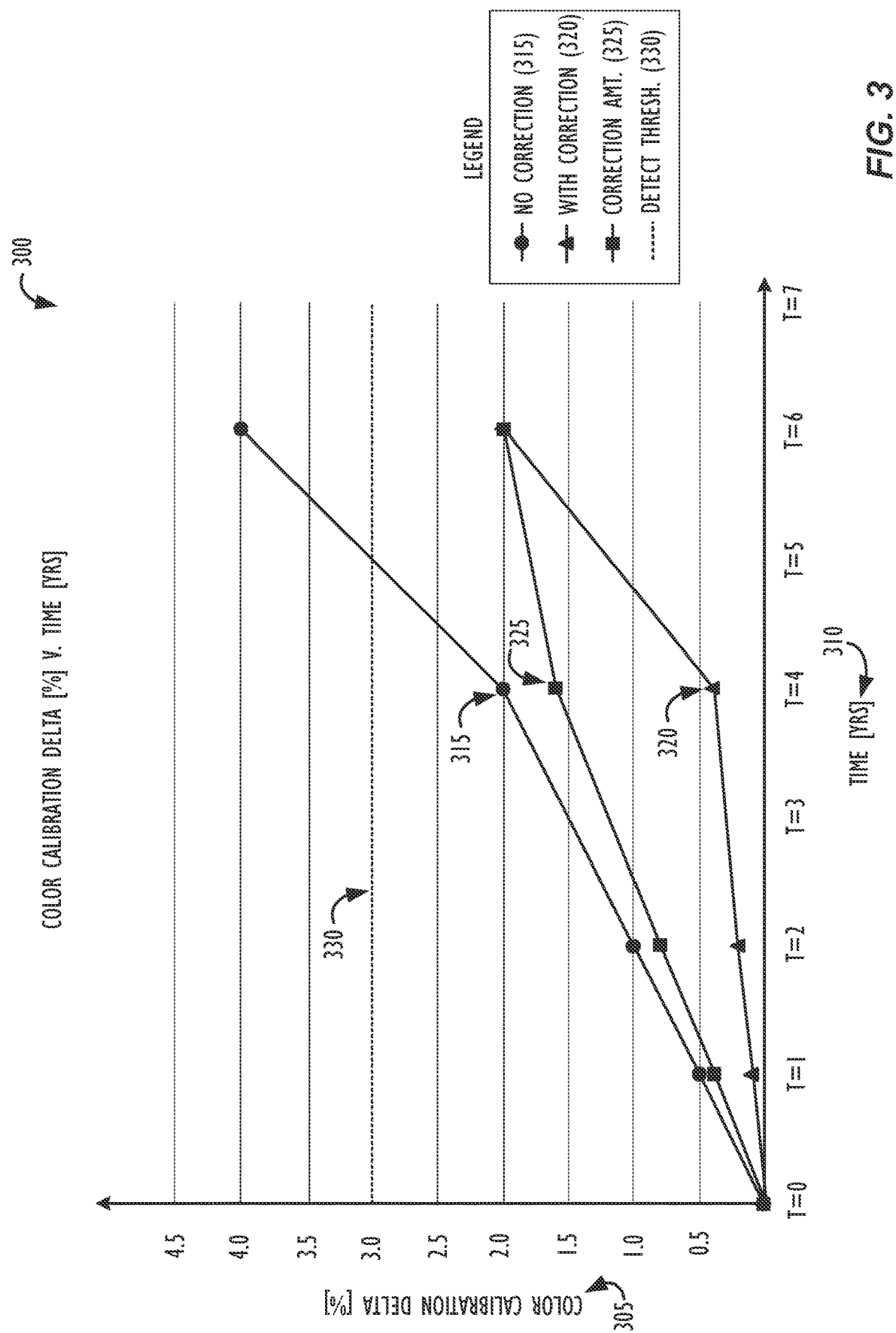
FIG. 3 illustrates another graph of color calibration deltas with and without compensation for optical changes in an optical element of an image capture device plotted against time, according to one or more embodiments.

Turning now to FIG. 3, another graph 300 of color calibration deltas with and without compensation for optical changes in an exemplary optical component of an image capture device plotted against time is shown, according to one or more embodiments. Along the y-axis 305 of graph 300 is color calibration delta percentage for the exemplary camera modules being plotted in graph 300, i.e., the amount by which the "factory" color calibration values will have deviated over time from their initial values, based on optical changes in the various optical components of the image capture device. Again, any desired measurement units may be used to model the color calibration delta needed by the component. Along the x-axis 310 of graph 300 is time (as measured in simulated years of component usage) for two exemplary camera modules, i.e., a camera module with no additional color calibration compensation applied over time (315) and a camera module with additional color calibration compensation applied over time, e.g., according to a time-varying color model (320), whose color reproduction deviation is being plotted in graph 300. As shown in FIG. 3, the use of the time-varying color model to apply additional compensation helps maintain the color calibration delta of camera module 320 under the exemplary 3% noticeability threshold (see dashed line 330) for a longer amount of time (i.e., for at least longer than the 6 years shown on graph 300) than the exemplary uncorrected camera module 315 (which exceeds the exemplary 3% noticeability threshold at around the 5 years of usage mark). Line 325 represents the amount of color correction delta percentage applied by year to camera module 320, i.e., according to the time-varying color model being used in this exemplary scenario.

Exemplary Methods of Performing Camera Color Calibration

Figure 4A:
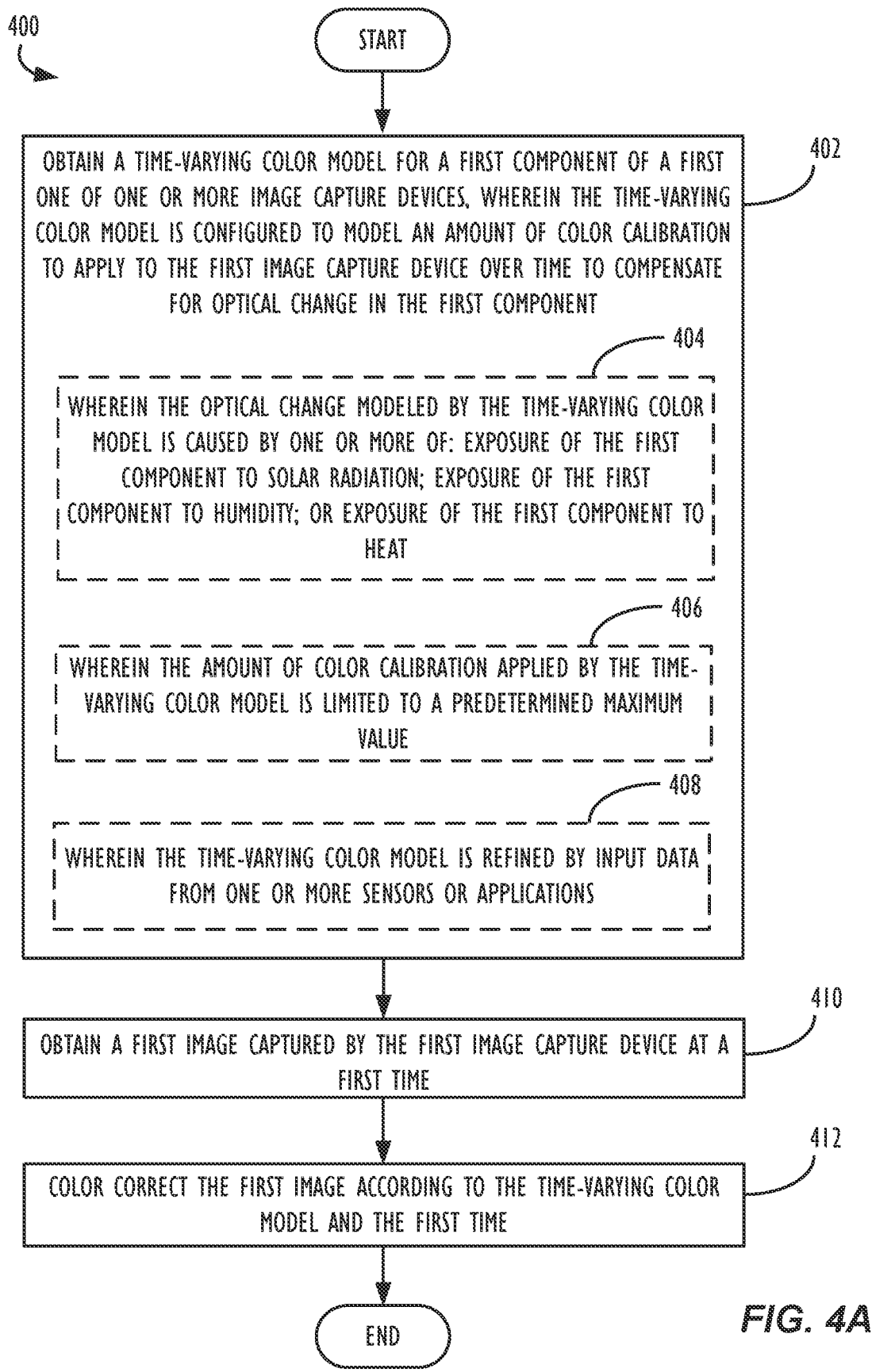
FIG. 4A is a flow chart illustrating a method of performing camera color calibration, according to various embodiments.

FIG. 4A is a flow chart, illustrating a method 400 of performing camera color calibration, according to various embodiments. First, at Step 402, the method 400 may obtain a time-varying color model for a first component of a first one of one or more image capture devices, wherein the time-varying color model is configured to model an amount of color calibration to apply to the first image capture device over time to compensate for optical change in the first component. As described above, in some cases, the optical change that is modeled by the time-varying color model is caused by one or more of: exposure of the first component to solar radiation; exposure of the first component to humidity; or exposure of the first component to heat (Step 404). In some cases, a final time-varying color model may comprise two or more different modeled components superimposed (or otherwise combined) with one another. In other cases, the final time-varying color model may be selected from among a plurality of candidate time-varying color models, based, at least in part, on input data received from one or more sensors or applications executing on the device. For example, a "high temperature" model may be selected if the image capture device is used in predominantly hot environments over its lifespan. In still other cases, the amount of color calibration applied by the time-varying color model may be limited to a predetermined maximum value (Step 406). For example, the predetermined maximum value may be either a maximum correction value for the lifetime of the camera module, or may instead be a predetermined maximum value per each of a predefined time period that follows an initial factory calibration of the first image capture device (e.g., a maximum of up to 2% additional compensation applied every 2 years, a maximum of up to 3% additional compensation applied every 3 years, etc.). In still other cases, the time-varying color model may be refined by input data from one or more sensors or applications of the electronic device housing the camera module (Step 408). For example, the time-varying color model may be refined by input data from one or more sensors of the device housing the camera module, such as a thermometer, GPS, altimeter, ambient light sensor, etc. Likewise, the time-varying color model may be refined by input data from one or more applications executing on the device, such as a weather application, a maps application, a clock application, etc. The input data used to refine the time-varying color model may comprise one or more of: a location of the device; a temperature in an ambient environment of the device; a humidity level in an ambient environment of the device; or a light level in an ambient environment of the device. For example, the more of a device's life span that is spent in a high temperature or high humidity environment, the more the model may be refined to apply its color compensation corrections more aggressively (or more early in the device's life span) than it would to a device that spent less of its life span in high temperature or high humidity environments.

Next, at Step 410, the method 400 may obtain a first image captured by the first image capture device at a first time. Finally, at Step 412, the method 400 may color correct the first image according to the time-varying color model and the first time. This correction may be applied to the raw image data, processed image data, or stored somewhere in the image's metadata (e.g., as a standard International Color Consortium (ICC) profile), such that the additional compensations may be applied any time the image is viewed or transmitted to another user, if so desired.

Figure 4B:
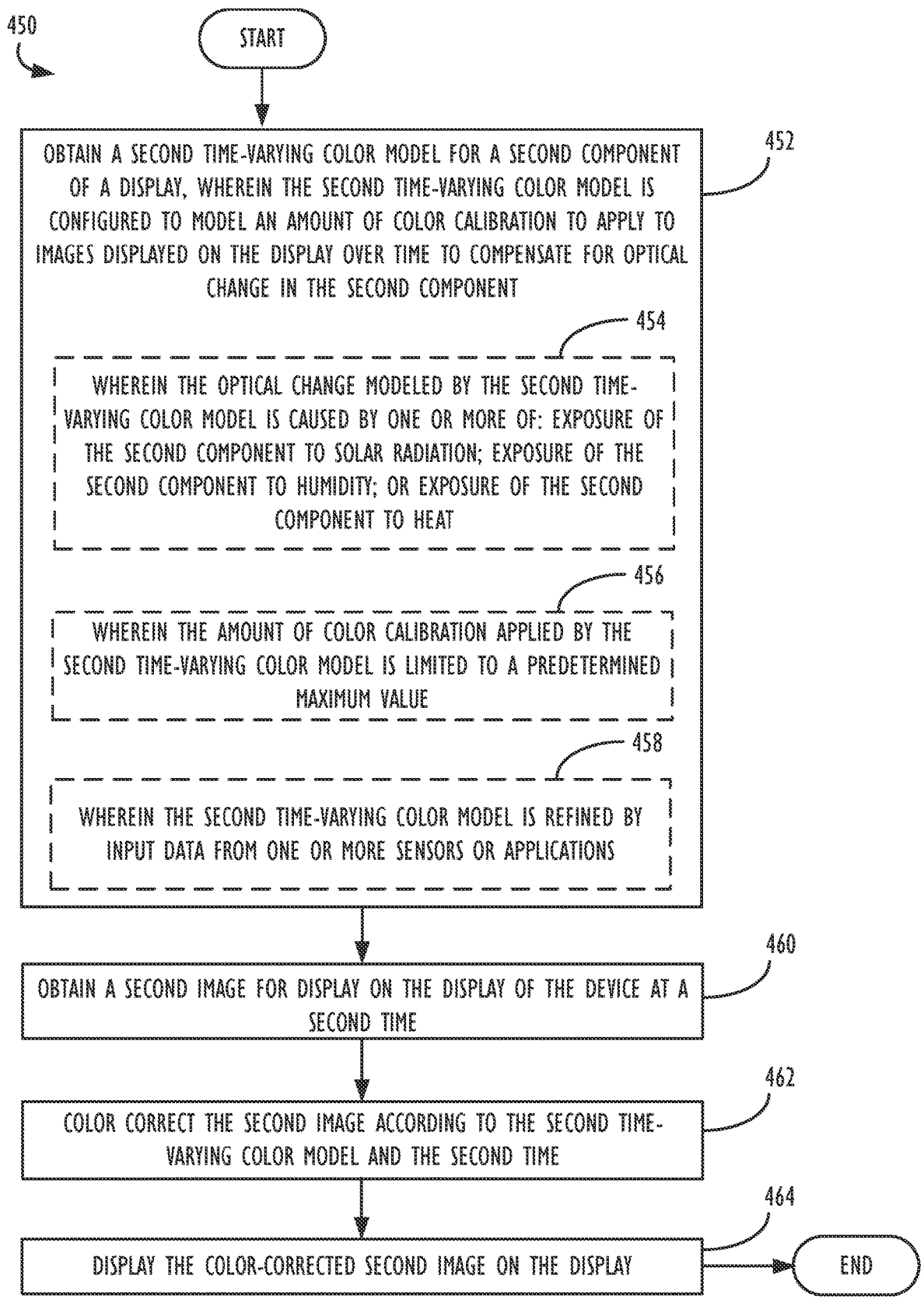
FIG. 4B is a flow chart illustrating a method of performing display color calibration, according to various embodiments.

FIG. 4B is a flow chart, illustrating a method 450 of performing display color calibration, according to various embodiments. Method 450 is merely exemplary of another type of component (i.e., a component or layer of a display screen of an electronic device) for which optical changes in components may also be compensated for over time using a time-varying color model. Method 450 may be performed in conjunction with (or separately from) method 400. First, at Step 452, the method 450 may obtain a second time-varying color model for a second component of a display, wherein the second time-varying color model is configured to model an amount of color calibration to apply to images displayed on the display over time to compensate for the optical change in the second component.

As described above, in some cases, the optical change that is modeled by the second time-varying color model is caused by one or more of: exposure of the second component to solar radiation; exposure of the second component to humidity; or exposure of the second component to heat (Step 454). In some such cases, a final second time-varying color model may comprise two or more different modeled components superimposed (or otherwise combined) with one another, e.g., modeled optical changes over time for two different layer components of display device. In other cases, the amount of color calibration applied by the time-varying color model may be limited to a predetermined maximum value (Step 456). For example, the predetermined maximum value may be either a maximum correction value for the lifetime of the camera module, or may instead be a predetermined maximum value per each of a predefined time period that follows an initial factory calibration of the first image capture device (e.g., a maximum of up to 2% additional compensation applied every 2 years, a maximum of up to 3% additional compensation applied every 3 years, etc.). In still other cases, the second time-varying color model may be refined by input data from one or more sensors or applications of the electronic device having the display (Step 458), as described above with respect to Step 408.

Next, at Step 460, the method 450 may obtain a second image for display on the display of the device at a second time (e.g., from a captured image, an image from a media file being displayed on the display, or simply a frame buffer sent for display by an operating system executing on the device). At Step 462, the method 450 may color correct the second image according to the second time-varying color model and the second time. For example, the display may be color corrected by adjusting one or more color components related to the images being displayed, according to the second time-varying color model. Finally, at Step 464, the method 450 may display the color-corrected second image on the display.

Exemplary Electronic Computing Devices

Figure 5:
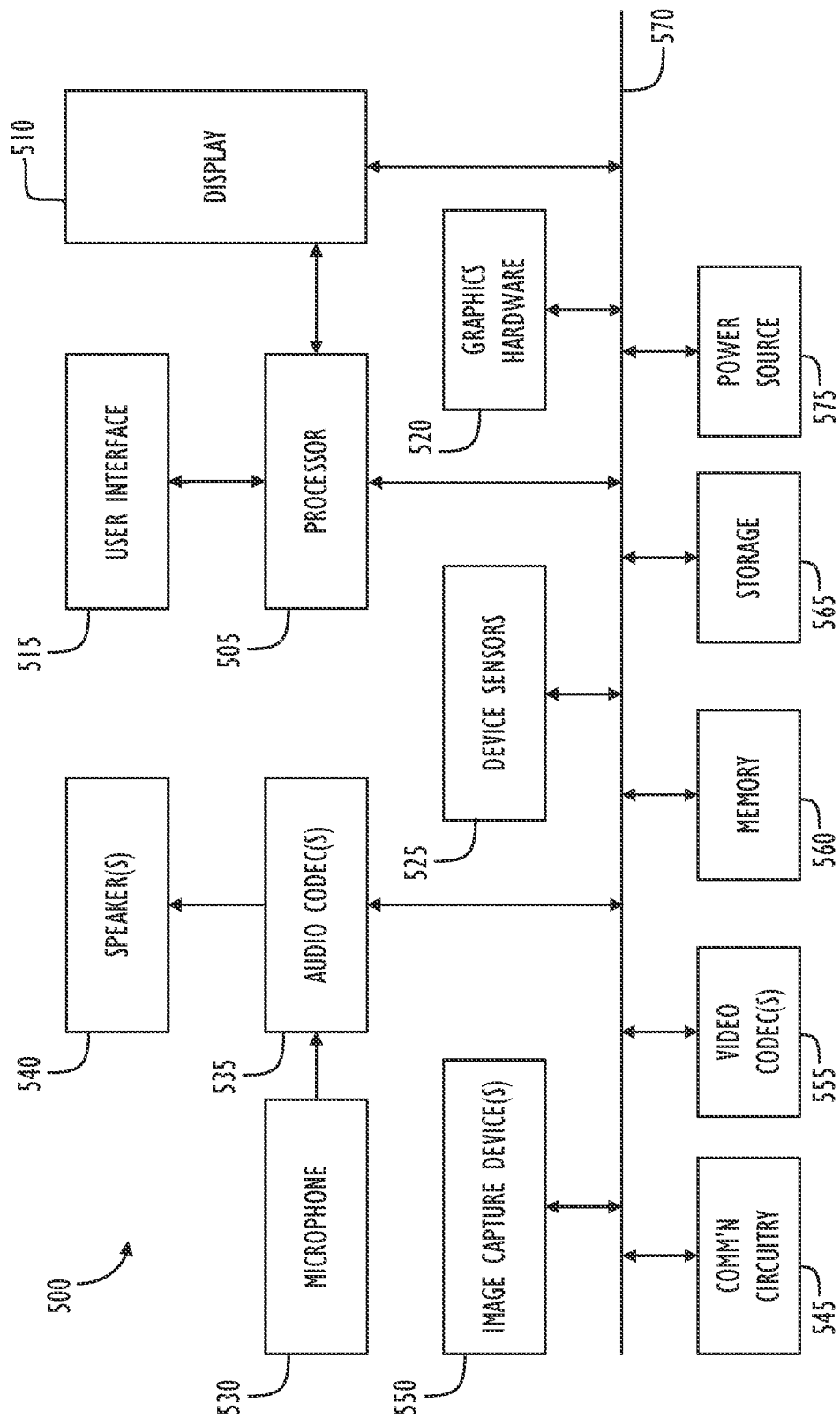
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs).

Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera module units configured to capture images, e.g., images which may be processed to generate color-corrected versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices; and
   one or more processors operatively coupled to the memory, wherein the one or more processors are configured to execute instructions causing the one or more processors to:
      obtain a time-varying color model for a first component of a first image capture device of the one or more image capture devices, wherein the time-varying color model is configured to model an amount of color calibration to apply to the first image capture device over time to compensate for optical change in the first component, and wherein the time-varying color model is refined by input data from one or more applications executing on the device;
      obtain a first image captured by the first image capture device at a first time; and
      color correct the first image according to the time-varying color model and the first time.

2. The device of claim 1, wherein the first component comprises an optical component of the first image capture device.

3. The device of claim 2, wherein the optical component comprises at least one of: a lens; an infrared (IR) cutoff filter; an anti-reflective coating; or a color filter array (CFA).

4. The device of claim 1, wherein the optical change modeled by the time-varying color model is caused by one or more of: exposure of the first component to solar radiation; exposure of the first component to humidity; or exposure of the first component to heat.

5. The device of claim 1, wherein the optical change modeled by the time-varying color model comprises deviations in factory-calibrated values of one or more of: spectral transmittance; or total color response.

6. The device of claim 1, wherein the amount of color calibration applied by the time-varying color model is limited to a predetermined maximum value.

7. The device of claim 6, wherein the predetermined maximum value comprises a 2% deviation from an initial factory-calibrated value.

8. The device of claim 1, wherein the amount of color calibration applied by the time-varying color model is limited to a predetermined maximum value per each of a predefined time period that follows an initial factory calibration of the first image capture device.

9. The device of claim 1, wherein the time-varying color model is refined by input data from one or more sensors of the device.

10. The device of claim 9, wherein the input data comprises one or more of: a location of the device; a temperature in an ambient environment of the device; a humidity level in an ambient environment of the device; or a light level in an ambient environment of the device.

11. The device of claim 1, wherein the time-varying color model is selected for obtaining from among a plurality of candidate time-varying color models, based, at least in part, on input data from one or more sensors of the device.

12. The device of claim 1, wherein the time-varying color model is selected for obtaining from among a plurality of candidate time-varying color models, based, at least in part, on input data from the one or more applications executing on the device.

13. The device of claim 1, wherein the time-varying color model further comprises a machine learning (ML) model trained to learn a correlation between one or more environmental factors experienced by the device over time and an amount of corresponding optical change in the first component of the first image capture device.

14. The device of claim 1, wherein the time-varying color model further comprises a function configured to correlate between one or more environmental factors experienced by the device over time and an amount of corresponding optical change in the first component of the first image capture device.

15. The device of claim 14, wherein the function comprises at least one of: a linear function; a polynomial function; an exponential function; or a piece-wise defined function.

16. The device of claim 1, wherein the instructions causing the one or more processors to color correct the first image according to the time-varying color model and the first time further comprise instructions causing the one or more processors to:
   adjust a color component measurement used to calibrate the first image capture device; or
   adjust a ratio of color component measurements used to calibrate the first image capture device.

17. The device of claim 1, further comprising a display, wherein the instructions further comprise instructions causing the one or more processors to:
   obtain a second time-varying color model for a second component of the display, wherein the second time-varying color model is configured to model an amount of color calibration to apply to images displayed on the display over time to compensate for optical change in the second component;
   obtain a second image for display on the display of the device at a second time;
   color correct the second image according to the second time-varying color model and the second time; and
   display the color-corrected second image on the display.

18. A non-transitory computer readable medium comprising computer readable instructions executable by one or more processors to:
   obtain a time-varying color model for a first component of a first image capture devices of an electronic device, wherein the time-varying color model is configured to model an amount of color calibration to apply to the first image capture device over time to compensate for optical change in the first component, and wherein the amount of color calibration applied by the time-varying color model is limited to a predetermined maximum value per each of a predefined time period that follows an initial factory calibration of the first image capture device;

obtain a first image captured by the first image capture device at a first time; and color correct the first image according to the time-varying color model and the first time.

19. An image processing method, comprising:

obtaining a time-varying color model for a first component of a first image capture device of one or more image capture devices of an electronic device, wherein the time-varying color model is configured to model an amount of color calibration to apply to the first image capture device over time to compensate for optical change in the first component, wherein the time-varying color model is selected for obtaining from among a plurality of candidate time-varying color models, based, at least in part, on input data from one or more sensors of the electronic device;

obtaining a first image captured by the first image capture device at a first time; and color correcting the first image according to the time-varying color model and the first time.

20. The method of claim 19, further comprising: refining the time-varying color model based, at least in part, on input data obtained from one or more applications executing on the electronic device.

* * * * *